United States Patent [19]

Simon

[11] Patent Number: 5,070,743

[45] Date of Patent: Dec. 10, 1991

[54] TUBULAR DRIVE SHAFT

[76] Inventor: Joseph A. Simon, 30855 Little Mack Ave., Roseville, Mich. 48066

[21] Appl. No.: 490,396

[22] Filed: Mar. 8, 1990

[51] Int. Cl.[5] .............................................. G05G 1/00
[52] U.S. Cl. .................................... 74/579 R; 72/260; 74/579 E
[58] Field of Search ............ 74/579 R, 579 E, 579 F; 72/260

[56] References Cited

U.S. PATENT DOCUMENTS

| 564,232 | 7/1896 | Swartz | 74/579 R |
|---|---|---|---|
| 652,068 | 6/1900 | Abrahamson | 74/579 R |
| 1,101,954 | 6/1914 | Petry | 74/579 R |
| 1,280,878 | 10/1918 | Seymour | 74/579 R |
| 1,670,532 | 5/1928 | Crawford | 74/579 X |
| 2,102,325 | 12/1937 | Kylstra | 74/579 R |
| 3,468,007 | 9/1969 | Nakamura | 74/579 R |
| 3,837,205 | 9/1974 | Simon | 72/260 |
| 3,886,649 | 6/1975 | Simon | 72/260 X |
| 4,277,969 | 7/1981 | Simon | 72/266 |
| 4,292,831 | 10/1981 | Simon | 72/260 |

Primary Examiner—Vinh T. Luong
Attorney, Agent, or Firm—Harness, Dickey & Pierce

[57] ABSTRACT

A large drive shaft is formed of an extruded metal, thin wall tube, having integral, annular, inwardly thickened, ring-like areas at its opposite ends. A number of radially inwardly directed ribs are integrally formed upon the inner wall surface of the tube wall and extend the full length of the tube between the ring-like areas. The ribs are spaced apart from each other and, preferably, area of a height which is less than the thickness of the thin wall. The opposite ends of the shaft are provided with conventional connecting means for connecting the shaft to a drive device and a driven device transmitting power therebetween.

13 Claims, 2 Drawing Sheets

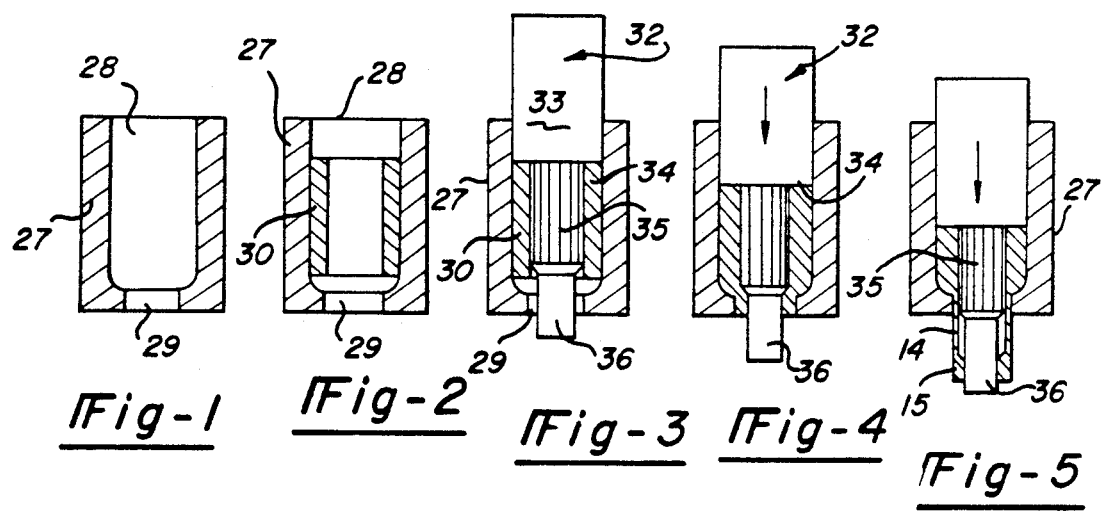
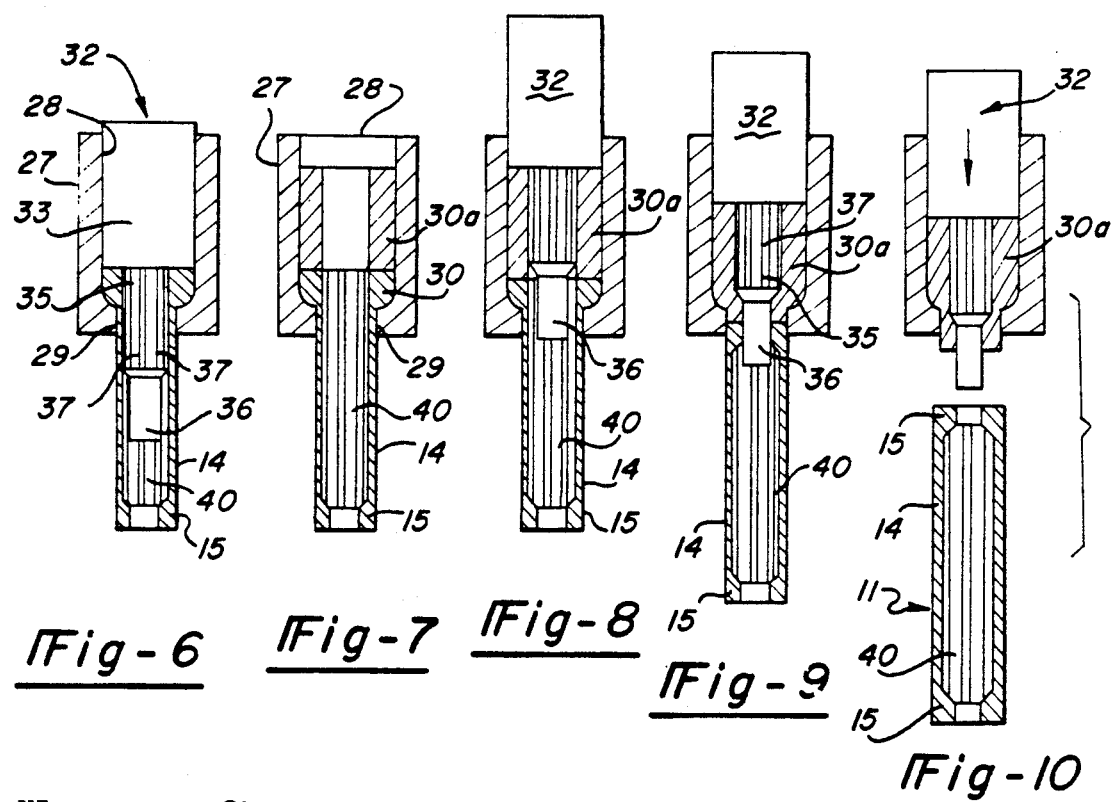
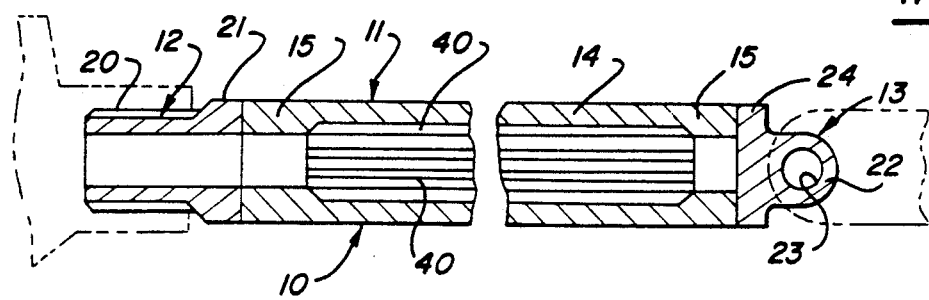

TUBULAR DRIVE SHAFT

BACKGROUND OF INVENTION

This invention relates to an extruded metal tube, having internal, longitudinally extending, spline-like ribs, and a method for forming the tube, which may be used as a drive shaft for connecting a driving device to a driven device. The tube is formed of a thin wall extrusion with the opposite ends of the wall thickened for forming connecting means for connecting the tube to other devices.

Large drive shafts, such as those which are commonly used for trucks and other heavy duty automotive vehicles are formed out of elongated tubes. A connection means is formed on each of the opposite ends of the tubes. For example, a splined connection portion may be welded on one end of the tube and a lug connection may be welded on the opposite end of the tube. In this example, the spline may connect with a power output of an engine transmission while the lug may connect to the power input of a differential which transmits the power, through axles, to the drive wheels of the vehicle. These large drive shafts are subject to considerable torsion or torque loads during portions of their rotation under different speed and power transmission loads and, thus, their walls must be thick enough to resist whipping or flexing or twisting during Thus, the invention herein is concerned with reducing the thickness of the walls of drive shafts, to reduce their costs, while simultaneously strengthening the shafts and reducing shaft deformation resulting from rotation.

Extruding metal tubes of the general type involved here, is known. For example, my prior U.S. Pat. Nos. 4,277,969 issued July 14, 1981 for a Method for Cold Forming Tubes with Interior Thicker Wall Sections, and No. 4,292,831 issued Oct. 6, 1981 for a Process for Extruding a Metal Tube with Inwardly Thickened End Portions, disclose tubes and processes for extruding such tubes. Other prior patents issued to me generally disclose processes for forming metal tubes with thickened portions. Examples are my prior U.S. Pat. No. 3,837,205 issued Sept. 24, 1974 and No. 3,886,649 issued June 3, 1975, and other such similar patents. Thus, this present application is concerned with an improvement which particularly adapts a cold formed or cold extruded tube for use as an improved, heavy duty power transmission drive shaft and for other purposes.

SUMMARY OF INVENTION

The invention herein contemplates forming a thin wall metal tube by cold or substantially cold forming or extrusion, with selectively thickened ring-like and with radially inwardly extending, longitudinal, elongated ribs which extend along the interior surface of the tube wall between the thickened wall portions. The ribs extend along the length of the thin wall portions of the tube and are integral with thickened, ring-like portions which are located at opposite ends of the tube, and also may be integral with additional ring-like portions located between the ends of the tubes. Thus, the ribs rigidify the tube and permit thinner walls so as to reduce the cost and weight of the tube.

An object of this invention is to provide thickened, integral, portions within an extruded, thin wall tube, which may be used as a heavy duty drive shaft, to permit reducing the overall thickness of the thin wall section while maintaining or increasing the strength of the tube. The thickened portions, which are in the form of a number of parallel, inwardly extending ribs and ring-like formations located within the tube, are extruded simultaneously with the extrusion of the thin wall sections of the tube.

Another object of this invention is to locate integral rib-like portions along the inside surface of an extruded thin wall tube for rigidifying the tube against bending or whipping or flexing while permitting reducing the metal content of the tube.

Still another object of this invention is to reduce the cost by forming integral ribs on its inner wall surface and reducing the wall thickness.

These and other objects and advantages of this invention will become apparent upon reading the following description, of which the attached drawings form a part.

DESCRIPTION OF DRAWINGS

FIG. 1 is a cross-sectional, schematic, elevational view of the extrusion die.

FIG. 2 is a cross-sectional view showing the tubular blank inserted within the die.

FIGS. 3-10 respectively show successive steps in the process of forming the tubular shaft.

FIG. 11 is a cross-sectional view of a completed drive shaft having connection means on its opposite ends.

DETAILED DESCRIPTION

Figure 12:
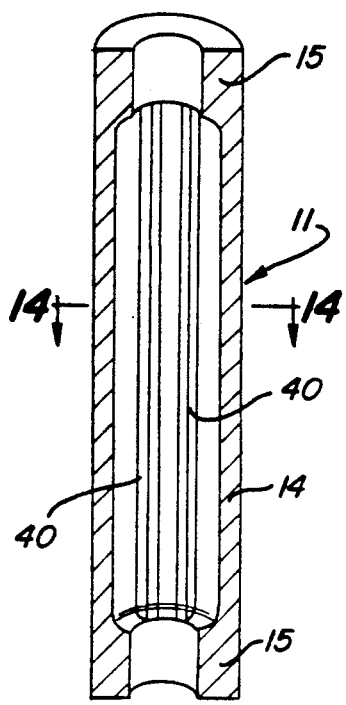
FIG. 12 is a perspective, cross-sectional view showing a longitudinal section of the tubular shaft.
Figure 13:
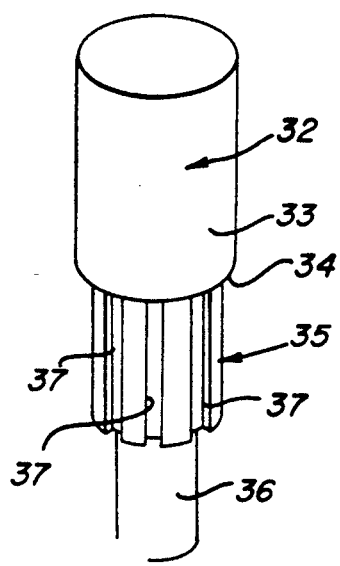
FIG. 13 is a perspective view of a punch with a mandrel section formed to produce the integral ribs within the tube.

FIG. 11 schematically illustrates, in cross-section, a cold formed, extruded tubular drive shaft which is useful as a vehicle drive shaft. The shaft 10 is formed of metal, such as a steel of required strength and specification for the intended purpose. The shaft comprises the extruded tube 11 with connection means 12 and 13 formed on its opposite ends. The tube 11 is formed with a thin wall section 14, which comprises most of the length of the tube, and thickened wall areas 15. Preferably the thickened wall areas form annular rings at the opposite ends of the thin wall section.

Although various types of connection means may be utilized, a conventional type comprises a connection means 12 having a gear-like spline 20 formed on its external or internal surface and a thick ring part 21 which is welded to the ring-like thickened wall area 15 of the tube. The welding may be accomplished by spin welding or other known forms of welding. Also, it is possible to form the spline-like connector integral with the tube.

The opposite end of the tube is provided with a connector 13 having a lug, which may be a single lug or a pair of spaced apart parallel lugs 22 having a central hole 23. The lug is part of a base portion 24 which is welded to the thickened ring area 15 on the tube.

Conventionally, drive shafts of the type described above are arranged with their spline end connected with a corresponding part on a power take-off device, such as a of the vehicle transmission. The spline permits a sliding connection with the power take-off part. The opposite end lug or lugs 22 are connected to a driven device, such as the power intake part of a differential or other similar power receiving mechanism which, in turn, connects to and drives the vehicle wheel axles (not shown).

FIGS. 1-10 schematically illustrate the steps in producing the thin wall tube with its thickened, ring-like annular end portions. Thus, FIG. 1 schematically illustrates a circular die 27 having an upper, inlet end 28, and a lower, circular die throat 29. As illustrated in FIG. 2, a short, tubular metal blank 30 is dropped into the inlet end of the die.

FIG. 3 schematically shows a punch 32 inserted in the die. The punch includes an elongated pressure end 33 which has an annular shoulder 34 that engages the upper end of the blank 30. The punch includes a rear, mandrel-like extension 35 that closely fits within the opening through the center of the blank.

A second or lead end, smaller diameter mandrel-like extension 36 is formed on the rear extension. A number of elongated grooves 37 are formed in the larger diameter, rear extension 35. These produce the ribs which will be described below.

As illustrated in FIG. 3, the punch is inserted in the die with its lead, smaller diameter extension generally located within the die throat 29 and its larger diameter, rear extension 35 positioned within the tubular blank. Next, as shown in FIG. 4, the punch is advanced towards the die throat, as indicated by the arrow. This pushes the blank towards the die throat and extrudes metal through the space between the smaller diameter extension 36 and the die throat.

As the punch advances, as shown in FIG. 5, the thickened ring end 15 is formed and then advances through the die throat. The continued movement of the punch positions the larger diameter extension 35 within the throat so that the metal extruded around the larger diameter extension is of the thinner wall portion of the tube. Moreover, the grooves 37 in the extension 35 simultaneously produce integral, elongated ribs within the inner wall surface of the thin wall tube. These ribs 40 are preferably of a radially measured height which is no greater than, and preferably considerably less than the thickness of the thin wall of the tube.

The extrusion of the tube continues, as shown in FIG. 6, until most of the tube blank is pressed through the die throat. At that point, the punch is removed and a second blank 30a is positioned in the die 27 upon the upper end of the first, partially extruded, blank 30 (see FIG. 7).

Next, as shown in FIG. 8, the punch is reinserted in the die and is advanced (see FIG. 9) so that the punch presses the second blank towards the die throat. The second blank 30a acts as if it were part of the punch and pushes the first blank through the die throat, around the smaller diameter extension 36 to produce the trailing, thickened ring-like end 15. Continued punch movement, as shown in FIG. 10, causes the first blank to exit from the die. Thereafter, the operation is continued with the second blank and the cycle is repeated.

Figure 14:
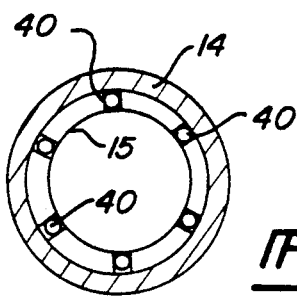
FIG. 14 is a cross-sectional view of the tubular shaft.

Referring to FIG. 12, the ribs 40 extend the full length of the thin wall section of the tube. Thus, the opposite ends of the ribs are integral with the thickened annular, or ring-like portions of the tube. Preferably, the heights of the ribs, measured radially inwardly of the tube, are less than the thickness of the thin wall portions of the tube. This is illustrated in FIG. 14 which shows a cross-section of the tube and the ribs and one of the inner, ring or annular thickened portions 15.

Figure 15:
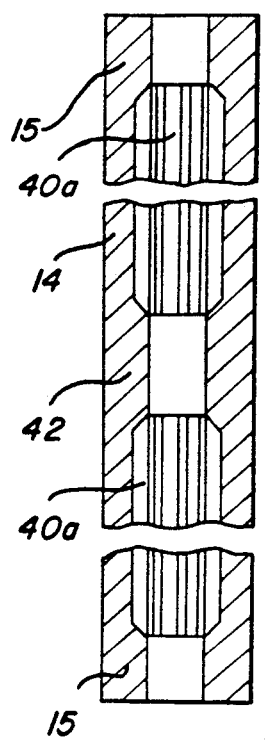
FIG. 15 is a cross-sectional view of a modified tubular shaft having an intermediate or centrally located ring-like enlargement within the tube wall.

FIG. 15 illustrates a modification which includes an intermediate thickened ring portion 42. In this case, the ribs 40a extend between the adjacent pairs of rings 15 and 42. The intermediate ring 42 may be located at any pre-selected place within the tube. Also, additional rings may be formed within the tube, as may be desired for a particular purpose, so that the tube may include a number of inwardly extending integral rings interconnected by ribs.

Figure 16:
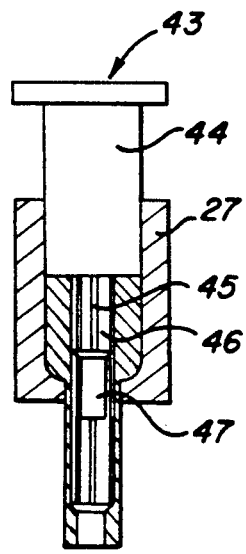
FIGS. 16, 17 and 18 show successive steps in the method of forming the type of tube shown in FIG. 15, that is, steps interposed between the steps illustrated in FIGS. 5 and 6.
Figure 17:
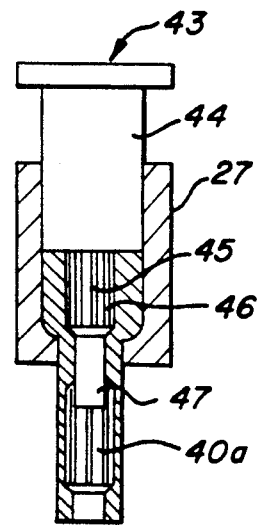
Figure 18:
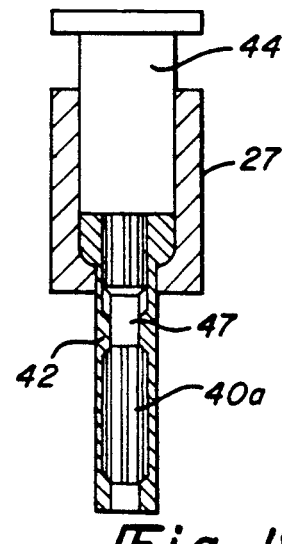

In order to form the intermediate ring 42, a second punch 43 is used. FIG. 16 illustrates the use of the second punch 43 following the step illustrated in FIG. 5 above. That is, the step shown in FIG. 5 is interrupted, and the punch 32 is removed from the die. The punch 43 is substituted, as shown in F g. 16. That punch has its punch body 44 located above the end of the blank and its larger diameter extension 45, with its grooves 46, located within the blank. However, its smaller diameter extension 47, which is located in the die throat, as shown in FIGS. 16 and 17, may be the same or a slightly larger diameter than the extension 36. This permits the extrusion of the ring 42, shown in FIG. 17 and FIG. 18. Following the step of FIG. 18, the second punch is removed and the first punch is replaced for continuing the extrusion and the steps illustrated in FIG. 6 through 10.

The number of ribs and the spacing between the ribs may be varied, depending upon the length of the drive shaft. By way of example, the drive shaft may be about 5 feet in length for use in a light truck and may have six or more ribs spaced around the interior of the tube, as shown in FIG. 14. Alternatively, more ribs may bs used so that the configuration is more spline-like in appearance. The number of ribs used and the dimensions of the rib will vary depending upon the length of the tube, the anticipated loads, and the thickness of the tube wall.

This invention may be further developed within the scope of the following claims.

Thus, having fully desribed an operative embodiment of this invention, I now claim:

1. A drive shaft for transmitting power from a driving device to a driven device, which shaft comprises an elongated, relatively thin wall tube having means on its opposite ends for connecting the tube to the devices, the improvement comprising:

said tube being formed of a metal extrusion of relatively thin, substantially uniform wall thickness, but with ring-like areas of such tube wall at its opposite ends, being of greater thickness than the intermediate portions of the tube located between the thickened areas, said tube having a central bore therethrough with a smaller diameter in the ring like areas than in the thin wall tube;

integral ribs formed on the thin wall inner wall surface during the extrusion of the thin wall and longitudinally extending between and connected at their opposite ends to said ring-like areas;

wherein the integral ribs and ring-like areas rigidifying and strengthening the tubular drive shaft thin wall to resist whipping, flexing or twisting.

2. A drive shaft as defined in claim 1, and including the ribs each extending continuously along the full length of the thin wall portion located between the ring-like areas.

3. A drive shaft as defined in claim 2, and with the rubs being of a height, measured radially inwardly of the tube, which is less than the thickness of the thin wall.

4. A drive shaft as defined in claim 1, and said ribs extending continuously along their lengths, generally parallel to the axis of the tube, for substantially the full length of the thin wall of the tube and with the heights of the ribs, measured radially inwardly, together with the thin wall portions of the tube with which the ribs are integral being approximately equal to the thickness of the thick wall areas of the tube.

5. A drive shaft as defined in claim 4, and including means formed on each end of the shaft for interconnecting the shaft with a driving device and with a driven device for transmitting power therebetween.

6. A drive shaft as defined in claim 4, and with the opposite ends of the ribs integral with their adjacent ring-like areas of the tube wall.

7. A drive shaft as defined in claim 1, and with at least one thicker, annular ring-like area located between the first mentioned ring-like areas and spaced therefrom, and said ribs extending the distances between and having their ends integral with their adjacent ring-like areas.

8. A drive shaft as defined in claim 1, and with the tube having at least one ring located a considerable distance from the opposite ends of the tube, and with the ribs extending between and integral with the rings.

9. A drive comprising an elongated, relatively thin wall, extruded metal tube comprising:

said tube being formed of a relatively thin wall, metal extrusion, of substantially uniform wall thickness, but with separated portions of the wall, near its opposite ends, being of greater thickness than the thin wall extrusion and forming interior rings on the inner surface of the tube thin wall, said tube having a central bore therethrough with a smaller diameter in the rings than in the tube thin wall;

a number of radially extending ribs formed integral with the tube thin wall and extending lengthwise of the tube between said rings and being integrally formed with the thin wall during the extrusion thereof;

whereby the ribs and rings form projections extending along the length of the thin wall which rigidify and strengthen the thin wall so as to resist bending and flexing thereof.

10. A drive shaft as defined in claim 9, and including splined means formed on one of the shaft for interconnecting that end with a vehicle transmission and lug means formed on the opposite end of the shaft for connection with cooperating means for connecting to a differential for transmitting power from the transmission to the differential when the shaft is rotated for driving the vehicle.

11. A drive shaft as defined in claim 10, and including the opposite ends of said elongated ribs being integral with the adjacent rings formed on the tube wall.

12. A drive shaft as defined in claim 10, and including said tube having several rings, with at least one of said rings located within the tube a substantial distance from the opposite ends thereof and being integral with the adjacent portions of the ribs.

13. A drive shaft as defined in claim 9, and including said ribs and said rings being located on the inner surface of the thin wall tube and being of a height, measured radially inwardly of the tube, which is less than the thickness of the thin wall of the tube.

* * * * *